(12) United States Patent
McClintock et al.

(10) Patent No.: US 8,042,869 B2
(45) Date of Patent: Oct. 25, 2011

(54) CHILD SEAT LINER

(75) Inventors: Christopher McClintock, Watkinsville, GA (US); Stephen R. Burns, Cumming, GA (US); Debbie Dunn, Cumming, GA (US)

(73) Assignee: Kids II, Inc.

( * ) Notice: Subject to any disclaimer, the term of this patent is extended or adjusted under 35 U.S.C. 154(b) by 324 days.

(21) Appl. No.: 12/172,588

(22) Filed: Jul. 14, 2008

(65) Prior Publication Data
US 2009/0015046 A1    Jan. 15, 2009

Related U.S. Application Data

(60) Provisional application No. 60/959,350, filed on Jul. 13, 2007.

(51) Int. Cl.
*A47C 31/00* (2006.01)

(52) U.S. Cl. ............... 297/219.12; 297/229; 297/256.17

(58) Field of Classification Search ............. 297/219.12, 297/229, 228, 218.1, 218.2, 256.17
See application file for complete search history.

(56) References Cited

U.S. PATENT DOCUMENTS

| | | | |
|---|---|---|---|
| 3,578,380 A | 5/1971 | Jacobus | |
| D289,123 S | 4/1987 | Tennen | |
| 4,655,502 A | 4/1987 | Houllis | |
| 4,666,207 A | 5/1987 | Quartano | |
| D296,730 S | 7/1988 | Fetterman | |
| D308,614 S | 6/1990 | Gordon | |
| 5,238,293 A | 8/1993 | Gibson | |
| D342,835 S | 1/1994 | Mink | |
| 5,330,250 A | 7/1994 | Reyes | |
| 5,829,835 A * | 11/1998 | Rogers et al. | ............ 297/256.17 |
| 5,916,089 A * | 6/1999 | Ive | ................... 5/655 |
| 5,967,606 A | 10/1999 | Bergh et al. | |
| 5,967,607 A | 10/1999 | Waldroup | |
| 6,036,264 A | 3/2000 | Lucree | |
| 6,129,417 A | 10/2000 | Cohen-Fyffe | |
| 6,129,418 A | 10/2000 | Bergh et al. | |
| 6,206,471 B1 | 3/2001 | McGowan | |
| 6,224,152 B1 | 5/2001 | Hughes et al. | |
| 6,237,998 B1 | 5/2001 | Aprile | |
| 6,491,996 B2 | 12/2002 | Digangi | |
| 6,517,155 B1 | 2/2003 | Landine | |
| 6,655,734 B2 | 12/2003 | Hunter et al. | |
| 6,666,510 B2 | 12/2003 | Solomon | |
| 6,669,289 B1 | 12/2003 | Hays | |
| 6,676,210 B1 | 1/2004 | Peyton | |
| 6,676,213 B1 | 1/2004 | Dlugos | |
| 6,702,381 B2 | 3/2004 | Endicott et al. | |

(Continued)

FOREIGN PATENT DOCUMENTS

GB           514644         5/1938

*Primary Examiner* — David Dunn
*Assistant Examiner* — Erika Garrett
(74) *Attorney, Agent, or Firm* — Alston & Bird, LLP

(57) ABSTRACT

A child seat liner provides a comfortable, safe, and hygienic environment for a child seated in a seat such as a shopping cart or a highchair. Child seat liners according to various embodiments of the invention include padding around the leg openings, multiple storage areas for the caregiver, a continuous, elastic front edge for stretching over and gripping a handle of a shopping cart or a front of a seat, one or more sets of fasteners for securing the liner in a rolled-up position, and an adjustable strap that allows the liner to be secured to the back of the seat more securely.

18 Claims, 7 Drawing Sheets

U.S. PATENT DOCUMENTS

| | | |
|---|---|---|
| 6,730,841 B2 | 5/2004 | Heckeroth |
| 6,735,792 B2 | 5/2004 | Johansson |
| 6,736,415 B1 | 5/2004 | Lenihan |
| 6,742,743 B2 | 6/2004 | Saint-Jalmes |
| 6,746,030 B1 | 6/2004 | Bartlett |
| 6,746,079 B2 | 6/2004 | Cabedo-Deslierres |
| 6,747,437 B2 | 6/2004 | Chiu |
| 6,749,258 B1 | 6/2004 | Leikin |
| 6,752,457 B2 | 6/2004 | Gold et al. |
| D492,830 S | 7/2004 | Rogers |
| 6,761,250 B1 | 7/2004 | Szentistvany et al. |
| 6,761,364 B2 | 7/2004 | Murar et al. |
| 6,763,736 B2 | 7/2004 | Hori et al. |
| 6,764,099 B2 | 7/2004 | Akiyama et al. |
| 6,764,134 B1 | 7/2004 | Crescenzi et al. |
| 6,766,892 B2 | 7/2004 | Martin et al. |
| 6,773,059 B2 | 8/2004 | Volotsenko |
| 6,779,620 B2 | 8/2004 | Taniguchi et al. |
| 6,779,913 B2 | 8/2004 | Niezrecki et al. |
| 6,782,963 B2 | 8/2004 | Hori et al. |
| 6,786,546 B2 | 9/2004 | McConnell et al. |
| 6,789,851 B2 | 9/2004 | Smith |
| 6,793,287 B2 | 9/2004 | Dunk |
| 6,795,972 B2 | 9/2004 | Rovira |
| 6,796,606 B2 | 9/2004 | Marshall |
| 6,799,393 B2 | 10/2004 | Stephen |
| 6,802,233 B2 | 10/2004 | Hori et al. |
| 6,802,400 B2 | 10/2004 | Ohura |
| 6,805,026 B2 | 10/2004 | Hori et al. |
| 6,805,365 B2 | 10/2004 | Lantz |
| 6,805,655 B2 | 10/2004 | Hori et al. |
| 6,814,405 B2 | 11/2004 | Norman |
| 6,817,663 B1 | 11/2004 | Stuart |
| 6,817,864 B1 | 11/2004 | Martinez |
| 6,820,708 B2 | 11/2004 | Nakamura |
| 6,823,828 B2 | 11/2004 | Nishi et al. |
| 6,827,125 B2 | 12/2004 | Warren |
| 6,830,114 B2 | 12/2004 | Hammonds |
| 6,830,168 B2 | 12/2004 | Hou |
| 6,832,421 B2 | 12/2004 | Ashida et al. |
| 6,832,766 B2 | 12/2004 | Stokes |
| 6,832,767 B1 | 12/2004 | Sandvik et al. |
| 6,832,768 B2 | 12/2004 | Duchene et al. |
| 6,832,884 B2 | 12/2004 | Robinson |
| 6,837,209 B2 | 1/2005 | Hori et al. |
| 6,837,337 B2 | 1/2005 | Thomas et al. |
| 6,839,924 B2 | 1/2005 | Sims |
| 6,842,699 B2 | 1/2005 | Estes |
| 6,845,720 B2 | 1/2005 | Summa |
| 6,845,835 B2 | 1/2005 | Kurohori et al. |
| 6,848,128 B2 | 2/2005 | Verbovszky et al. |
| 6,848,530 B2 | 2/2005 | Tani |
| 6,848,743 B1 | 2/2005 | Collins |
| 6,850,894 B2 | 2/2005 | Koda et al. |
| 6,851,749 B2 * | 2/2005 | Norman .................. 297/256.17 |
| 6,851,750 B2 | 2/2005 | Sampson et al. |
| 6,857,649 B2 | 2/2005 | Patton |
| 6,857,707 B2 | 2/2005 | Guile |
| 6,857,952 B2 | 2/2005 | Tomcak et al. |
| 6,860,094 B1 | 3/2005 | Abrams |
| 6,860,345 B2 | 3/2005 | Hammonds |
| 6,860,366 B2 | 3/2005 | Hori et al. |
| 6,860,555 B2 | 3/2005 | Kassai et al. |
| 6,860,557 B2 | 3/2005 | Jonasson |
| 6,863,350 B1 | 3/2005 | McCulley et al. |
| 6,869,085 B2 | 3/2005 | Pettigrew et al. |
| 6,871,434 B2 | 3/2005 | Sunaga et al. |
| 6,871,723 B2 | 3/2005 | Varela |
| 6,876,924 B2 | 4/2005 | Morita et al. |
| 6,879,424 B2 | 4/2005 | Vincent et al. |
| D505,754 S | 5/2005 | Cohen-Fyffe |
| 6,886,655 B2 | 5/2005 | Varela et al. |
| 6,889,998 B2 | 5/2005 | Sterns et al. |
| 6,892,847 B2 | 5/2005 | Seiki |
| 6,893,032 B2 | 5/2005 | Kershaw |
| 6,905,169 B1 | 6/2005 | Donoghue |
| 6,910,696 B2 | 6/2005 | Bargery et al. |
| 6,913,271 B2 | 7/2005 | Gordon |
| 6,918,631 B2 | 7/2005 | Verbovszky |
| 6,923,356 B2 | 8/2005 | Reynolds |
| 6,925,798 B2 | 8/2005 | Hori et al. |
| 6,926,291 B1 | 8/2005 | Ondrasik |
| 6,926,359 B2 | 8/2005 | Runk |
| 6,929,282 B1 | 8/2005 | Zoratti et al. |
| 6,929,326 B2 | 8/2005 | Cohen-Fyffe |
| 6,932,427 B2 | 8/2005 | Tamura |
| 6,932,429 B2 | 8/2005 | Kamiki |
| 6,935,648 B2 | 8/2005 | Beck |
| 6,935,685 B2 | 8/2005 | Kassai et al. |
| 6,937,755 B2 | 8/2005 | Orpaz et al. |
| 6,937,998 B1 | 8/2005 | Swartz et al. |
| 6,938,623 B2 | 9/2005 | Graupner et al. |
| 6,938,954 B1 | 9/2005 | Hendren et al. |
| 6,942,295 B1 | 9/2005 | Lopez |
| 6,944,981 B1 | 9/2005 | Garberg et al. |
| 6,948,393 B2 | 9/2005 | Hori et al. |
| 6,948,725 B2 | 9/2005 | Sampson et al. |
| 6,955,363 B2 | 10/2005 | Libretti et al. |
| 6,956,484 B2 | 10/2005 | Crespo |
| 6,959,940 B2 | 11/2005 | Perena |
| 6,959,963 B2 | 11/2005 | Hunter et al. |
| 6,962,525 B2 | 11/2005 | Tomcak et al. |
| 6,966,089 B2 | 11/2005 | Gold et al. |
| 6,966,223 B2 | 11/2005 | Yamazaki et al. |
| 6,966,565 B1 | 11/2005 | Ryan et al. |
| 6,966,566 B2 | 11/2005 | Duchene et al. |
| 6,971,471 B2 | 12/2005 | Baker et al. |
| 6,975,856 B2 | 12/2005 | Ogasawara |
| 6,976,690 B2 | 12/2005 | Freeman |
| 6,978,499 B2 | 12/2005 | Gallant et al. |
| 6,979,004 B2 | 12/2005 | Otterlee et al. |
| D513,888 S | 1/2006 | Santamaria |
| 6,981,541 B2 | 1/2006 | Warren |
| 6,981,708 B1 | 1/2006 | Tucker et al. |
| 6,983,944 B2 | 1/2006 | Bergia |
| 6,991,243 B2 | 1/2006 | Boyle et al. |
| 6,992,574 B2 | 1/2006 | Aupperle et al. |
| 6,994,364 B2 | 2/2006 | Nelson et al. |
| 6,997,274 B2 | 2/2006 | Metten |
| 7,004,480 B2 | 2/2006 | Trubiano |
| 7,004,542 B2 | 2/2006 | Saint-Jalmes |
| 7,011,365 B2 | 3/2006 | Kerfoot et al. |
| 7,011,366 B1 | 3/2006 | Cornella |
| 7,017,920 B2 | 3/2006 | Fraser |
| 7,017,938 B2 | 3/2006 | Kinzel |
| 7,017,940 B2 | 3/2006 | Hatfull |
| 7,023,177 B1 | 4/2006 | Bussinger |
| 7,025,299 B2 | 4/2006 | Badiali et al. |
| 7,029,066 B1 | 4/2006 | Myers-Jones |
| 7,029,069 B2 | 4/2006 | Hendren et al. |
| 7,036,699 B1 | 5/2006 | Hay et al. |
| 7,036,725 B2 | 5/2006 | Blaeuer |
| 7,036,831 B2 | 5/2006 | Coffman |
| 7,044,499 B2 | 5/2006 | Miyata et al. |
| 7,044,547 B2 | 5/2006 | Sorrenti |
| 7,052,085 B2 | 5/2006 | Hoey-Slocombe et al. |
| D523,207 S | 6/2006 | Tucker et al. |
| 7,059,000 B2 | 6/2006 | Verbovszky |
| 7,063,337 B2 | 6/2006 | Russell et al. |
| 7,069,782 B2 | 7/2006 | Handa et al. |
| 7,070,060 B1 | 7/2006 | Feider et al. |
| 7,070,238 B1 | 7/2006 | Alexander et al. |
| 7,073,800 B2 | 7/2006 | Shaw et al. |
| 7,073,866 B1 | 7/2006 | Berdahl |
| 7,079,158 B2 | 7/2006 | Lambertsen |
| 7,080,732 B2 | 7/2006 | Bonfanti |
| 7,080,844 B2 | 7/2006 | Espejo |
| 7,083,363 B2 | 8/2006 | Baker |
| 7,086,143 B2 | 8/2006 | Gass |
| 7,093,841 B2 | 8/2006 | Conrad |
| 7,093,904 B1 | 8/2006 | McMillen |
| 7,097,207 B2 | 8/2006 | Kudo et al. |
| 7,097,243 B2 | 8/2006 | Verbovszky |
| 7,097,244 B2 | 8/2006 | Holmgren et al. |
| 7,100,982 B2 | 9/2006 | Lundgren |
| 7,104,552 B2 | 9/2006 | Swanson et al. |
| 7,104,568 B2 | 9/2006 | Miyata |

| | | |
|---|---|---|
| 7,107,865 B2 | 9/2006 | Tomita et al. |
| 7,108,090 B2 | 9/2006 | Turner |
| 7,108,094 B2 | 9/2006 | Daniels |
| 7,134,684 B2 | 11/2006 | Miyata |
| 7,137,394 B2 | 11/2006 | Graupner et al. |
| 7,140,418 B2 | 11/2006 | Botham et al. |
| 7,140,563 B2 | 11/2006 | Sinden et al. |
| 7,142,116 B2 | 11/2006 | Yamagiwa |
| 7,146,661 B1 | 12/2006 | Riehl |
| 7,147,283 B2 | 12/2006 | Feist |
| 7,150,499 B2 | 12/2006 | McGregor |
| 7,152,834 B2 | 12/2006 | Hsu |
| 7,156,458 B2 | 1/2007 | Hanberg |
| 7,168,711 B2 | 1/2007 | Ondrasik |
| 7,172,045 B2 | 2/2007 | Takayanagi et al. |
| 7,174,996 B2 | 2/2007 | Hori et al. |
| 7,177,729 B2 | 2/2007 | Fukui |
| 7,178,455 B2 | 2/2007 | Jacq et al. |
| 7,178,871 B1 | 2/2007 | Round et al. |
| 7,182,349 B2 | 2/2007 | Prather et al. |
| 7,182,353 B2 | 2/2007 | Divers |
| 7,188,849 B2 | 3/2007 | Lee |
| 7,192,086 B2 | 3/2007 | Davis et al. |
| 7,195,155 B2 | 3/2007 | Garberg et al. |
| 7,198,287 B2 | 4/2007 | Miyata |
| 7,198,320 B2 | 4/2007 | Ramussen |
| 7,210,426 B2 | 5/2007 | Yeung |
| 7,213,697 B2 | 5/2007 | Martin et al. |
| 7,213,878 B2 | 5/2007 | Delapaz |
| 7,213,882 B2 | 5/2007 | Dryburgh et al. |
| 7,216,893 B2 | 5/2007 | Miyata |
| 7,216,912 B2 | 5/2007 | Takeshima |
| 7,219,868 B2 | 5/2007 | Marler et al. |
| 7,219,901 B2 | 5/2007 | Ryan |
| 7,220,011 B2 | 5/2007 | Hurwitz |
| 7,222,505 B2 | 5/2007 | Ronchi |
| 7,222,817 B2 | 5/2007 | Stringer |
| 7,222,917 B2 | 5/2007 | Ward |
| 7,226,059 B1 | 6/2007 | Samuels |
| 7,226,074 B2 | 6/2007 | Miyata |
| 7,229,083 B2 | 6/2007 | Arai et al. |
| 7,231,996 B2 | 6/2007 | Karube et al. |
| 7,234,771 B2 | 6/2007 | Nakhla |
| 7,237,491 B2 | 7/2007 | Faucher et al. |
| 7,237,782 B2 | 7/2007 | Tucker et al. |
| 7,249,778 B2 | 7/2007 | Scott et al. |
| 7,249,779 B2 | 7/2007 | Ehrenreich et al. |
| 7,252,268 B2 | 8/2007 | Saint-Jalmes |
| 7,252,313 B2 | 8/2007 | Browne et al. |
| 7,252,330 B2 | 8/2007 | Lincoln |
| 7,258,031 B2 | 8/2007 | Hori et al. |
| 7,258,181 B2 | 8/2007 | Hammonds |
| 7,259,357 B2 | 8/2007 | Walker |
| 7,261,308 B2 | 8/2007 | Gwisdalla et al. |
| 7,261,380 B2 | 8/2007 | Ha |
| 7,263,827 B2 | 9/2007 | Oshima et al. |
| 7,264,270 B2 | 9/2007 | Miyata et al. |
| 7,270,372 B2 | 9/2007 | Robertson |
| 7,273,226 B2 | 9/2007 | Miyata |
| 7,281,285 B2 | 10/2007 | Zucker et al. |
| 7,284,790 B1 | 10/2007 | Brewer |
| 7,284,792 B1 | 10/2007 | Dabney et al. |
| 7,350,788 B2 | 4/2008 | Booker |
| 7,367,621 B1 | 5/2008 | Han-Dressor et al. |
| 7,374,182 B2 | 5/2008 | Gurley et al. |
| 7,398,977 B2 | 7/2008 | Short |
| 7,686,391 B2 | 3/2010 | Nakagome |
| 7,695,066 B2 | 4/2010 | Guercia et al. |
| 2001/0022457 A1 | 9/2001 | Voris |
| 2001/0048235 A1 | 12/2001 | Hartranft |
| 2002/0014793 A1 | 2/2002 | Santha |
| 2002/0014794 A1 | 2/2002 | Chow |
| 2002/0070592 A1 | 6/2002 | Norman |
| 2003/0127889 A1 | 7/2003 | Solomon |
| 2003/0193223 A1 | 10/2003 | Norman |
| 2003/0205922 A1 | 11/2003 | Norman |
| 2003/0227202 A1 | 12/2003 | Endicott et al. |
| 2004/0017100 A1 | 1/2004 | Gold et al. |
| 2004/0066070 A1 | 4/2004 | Sampson et al. |
| 2004/0075318 A1 | 4/2004 | Wroobel |
| 2004/0145224 A1 | 7/2004 | Kassai et al. |
| 2004/0155498 A1 | 8/2004 | Verbovszky |
| 2004/0195878 A1 | 10/2004 | Kassai et al. |
| 2004/0207239 A1 | 10/2004 | King |
| 2004/0217633 A1 | 11/2004 | Kassai et al. |
| 2004/0227383 A1 | 11/2004 | Kassai et al. |
| 2004/0239163 A1 | 12/2004 | Runk |
| 2004/0245819 A1 | 12/2004 | Bugher |
| 2005/0012366 A1 | 1/2005 | Cohen-Fyffe |
| 2005/0057080 A1 | 3/2005 | Collins |
| 2005/0099044 A1 | 5/2005 | Nakhla |
| 2005/0110315 A1 | 5/2005 | Littlehorn et al. |
| 2005/0200174 A1 | 9/2005 | Morgan et al. |
| 2005/0264055 A1 | 12/2005 | Lincoln |
| 2005/0264056 A1 | 12/2005 | Hanberg |
| 2005/0275257 A1 | 12/2005 | McGregor |
| 2006/0001299 A1 | 1/2006 | Sallus |
| 2006/0006710 A1 | 1/2006 | Sallus |
| 2006/0006711 A1 | 1/2006 | Rich |
| 2006/0082196 A1 | 4/2006 | McConnell et al. |
| 2006/0181121 A1 | 8/2006 | Delapaz |
| 2006/0208545 A1 | 9/2006 | Cornella |
| 2006/0232112 A1 | 10/2006 | Karr |
| 2006/0250002 A1 | 11/2006 | Baier et al. |
| 2007/0029851 A1 | 2/2007 | Nishimoto |
| 2007/0040425 A1 | 2/2007 | Miles et al. |
| 2007/0085391 A1 | 4/2007 | Pines et al. |
| 2007/0085392 A1 | 4/2007 | Friedland et al. |
| 2007/0108810 A1 | 5/2007 | Nishimoto et al. |
| 2007/0152410 A1 | 7/2007 | Clark et al. |
| 2007/0158984 A1 | 7/2007 | Davis et al. |
| 2008/0211280 A1 | 9/2008 | Reynolds |
| 2008/0258528 A1 | 10/2008 | Bush et al. |

* cited by examiner

CHILD SEAT LINER

CROSS REFERENCE TO RELATED APPLICATIONS

This application claims priority to U.S. Provisional Application Ser. No. 60/959,350, filed Jul. 13, 2007 and entitled "SHOPPING CART LINER," which is herein incorporated by reference in its entirety.

BACKGROUND OF INVENTION

Traditionally, caregivers have used various means to protect their child from exposure to germs and to provide comfort and safety for their child while he is seated in a shopping cart or a highchair. There are several types of seat covers that have been developed over the years that provide some protection, safety, comfort and storage. None of the current seat covers provide extra bolstering and padding for the child around the leg openings, nor do they provide a fully integrated, adjustable safety belt with an adjustable safety strap simultaneously.

Most seat covers and liners have a back panel that sits over the seat's back rest, along with a pocket or pockets with elastic on the opening top edge as the only means of storage. Although this is common location for storage in known liners, it is cumbersome for the parent/caregiver to access because of having to reach over the child or walk around the side of the seat.

BRIEF SUMMARY OF VARIOUS EMBODIMENTS OF THE INVENTION

Various embodiments of a child seat liner are described below. The child seat liner may be disposed within a seat, such as a shopping cart seat or a highchair, to provide a hygienic barrier for a child seated within the seat. According to various embodiments, the child seat liner includes a bottom portion, a front portion, a first side portion, a second side portion, and a back panel. The bottom portion has a front side, a back side opposite the front side, a first side, and a second side opposite the first side, wherein the back side is disposed intermediate the first side and the second side. The front portion is disposed adjacent the front side, and the front portion defines two leg openings through which the child's legs may pass when seated on the bottom portion. The first side portion is disposed adjacent the first side, and the second side portion is disposed adjacent the second side of the bottom portion. The back panel is disposed adjacent the back side of the bottom portion. The leg openings comprise a padded material around a perimeter thereof.

In another embodiment, the child seat liner comprises a bottom portion, a front portion, a first side portion, a second side portion, and a back panel similar to those described above. In addition, the child seat liner further includes a back flap and an adjustable strap. The back flap includes an upper perimeter that is disposed adjacent an upper perimeter of the back panel. The adjustable strap comprises a first portion and a second portion, and each of the first portion and the second portion comprises a fixed end and a free end. The fixed end of the first portion is disposed adjacent the back panel, and the fixed end of the second portion is disposed adjacent the back panel. The back flap further comprises a first side perimeter and a second side perimeter. The first side perimeter defines a first side opening through which the free end of the first portion of the adjustable strap is threadable, and the second side perimeter defines a second side opening through which the free end of the second portion is threadable. The back flap further defines a first opening and a second opening on an outer surface of the back flap, and the free end of the first portion is threadable through the first opening and the free end of the second portion is threadable through the second opening such that fasteners attached to the free ends of the first portion and the second portion are engagable adjacent the outer surface of the back flap.

According to another embodiment, a child seat liner includes a bottom portion, a front portion, a first side portion, a second side portion, and a back panel as described above. The upper perimeters of the front portion and the first and second side portions form a continuous upper edge, and at least a portion of the continuous upper edge is elastic. In particular, in one embodiment, an elastic band is integrated into the first and second side portions adjacent the front portion such that the continuous edge may be stretched over and grip a handle of a shopping cart or a front of a seat.

In another embodiment, a child seat liner includes a bottom portion, a front portion, a back panel, and first and second side portions, similar to those embodiments described above. The bottom portion, the front portion, the first and second side portions, and the back panel include a top surface and a bottom surface, and the bottom surface faces a seat when the seat liner is disposed within the seat. The bottom surface of the front portion comprises at least one fastener disposed adjacent the leg openings, and the bottom surface of the back panel comprises at least one mating fastener disposed adjacent an upper perimeter of the back panel. When the top surfaces of the side portions, the back panel, and the front portion are folded toward the top surface of the bottom portion, the at least one fastener on the front portion is engagable with the at least one fastener on the back panel for securing the child seat liner in a rolled-up position.

BRIEF DESCRIPTION OF THE DRAWINGS

Figure 1:
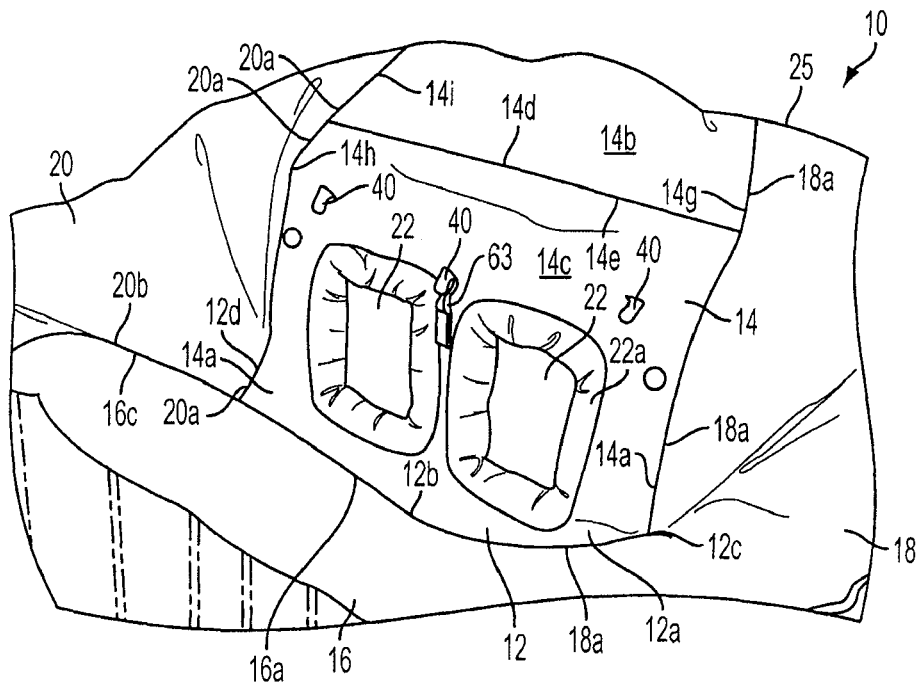

Having thus described various embodiments of the invention in general terms, reference will now be made to the accompanying drawings, which are not necessarily drawn to scale, and wherein:

FIG. 1 illustrates an upper perspective view of a child seat liner according to one embodiment of the invention.

Figure 2:
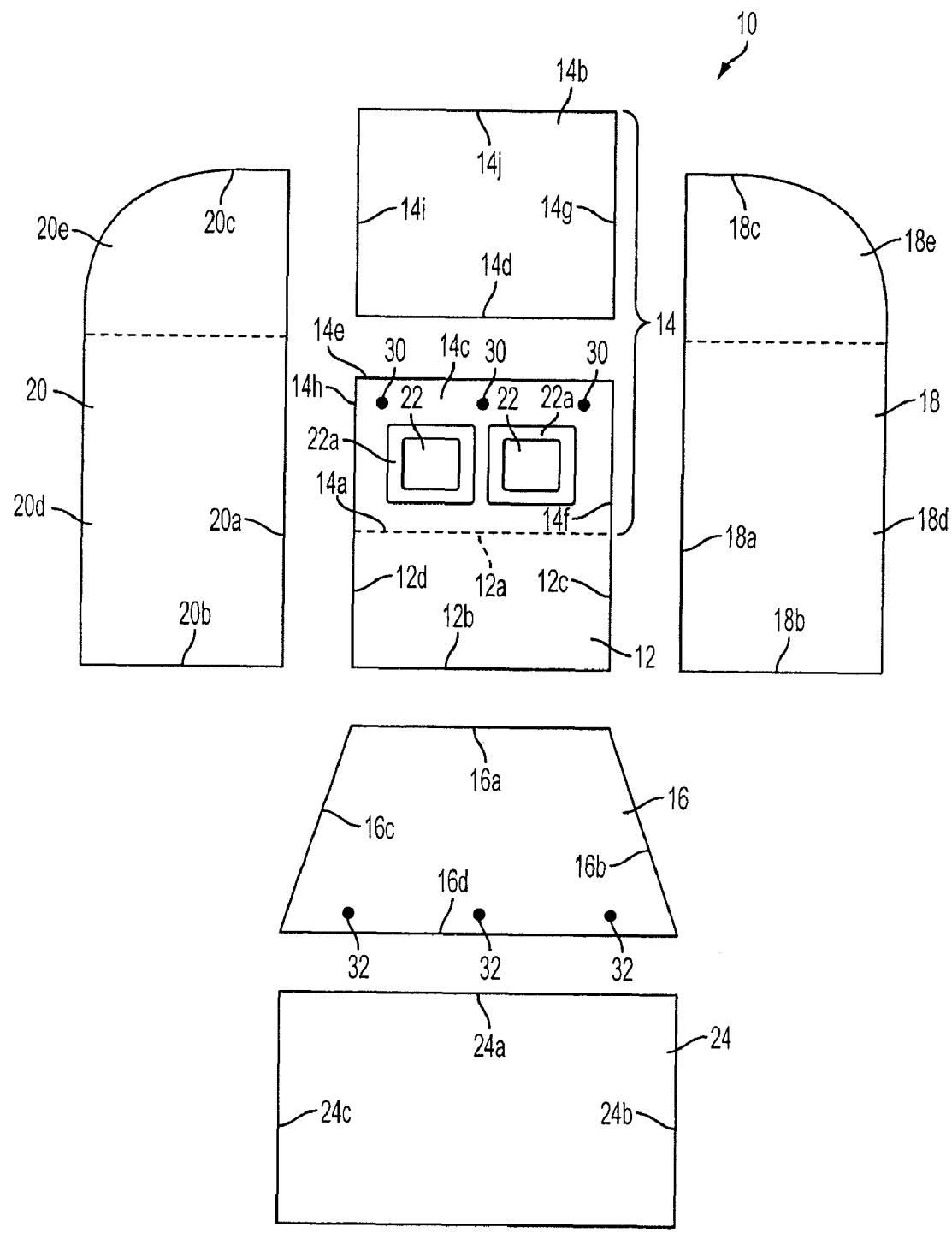

FIG. 2 illustrates a schematic, exploded view of various portions of the child seat liner shown in FIG. 1.

Figure 3:
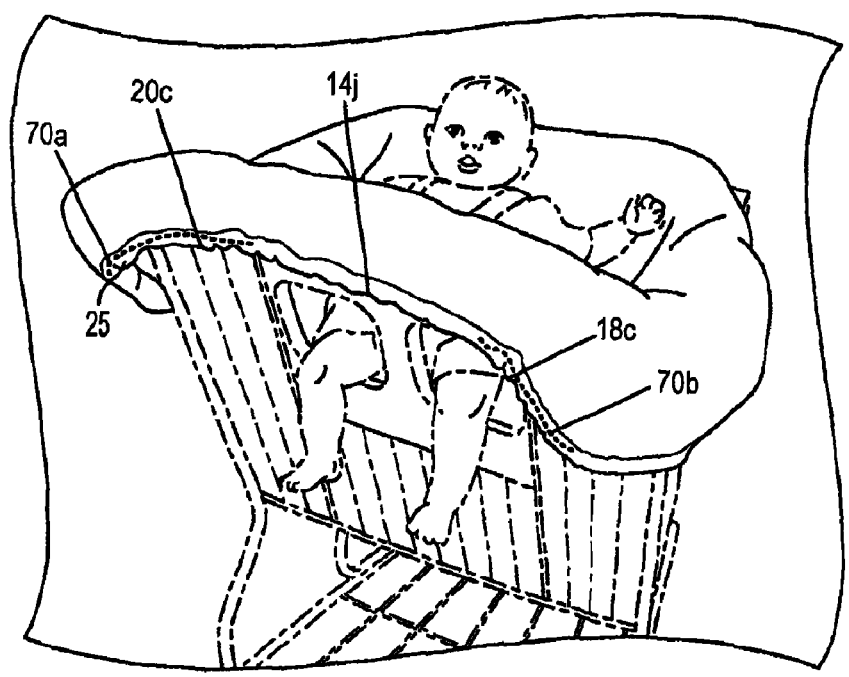

FIG. 3 illustrates a front perspective view of the child seat liner shown in FIG. 1 in use with a shopping cart seat and a child seated therein according to one embodiment of the invention.

Figure 4:
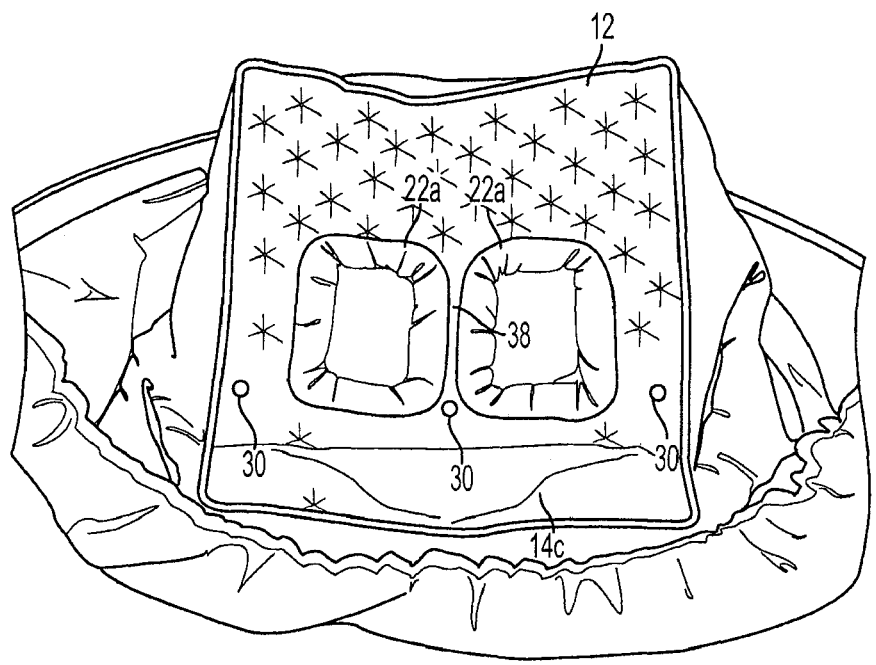

FIG. 4 illustrates a lower perspective view of the child seat liner shown in FIG. 1.

Figure 5:
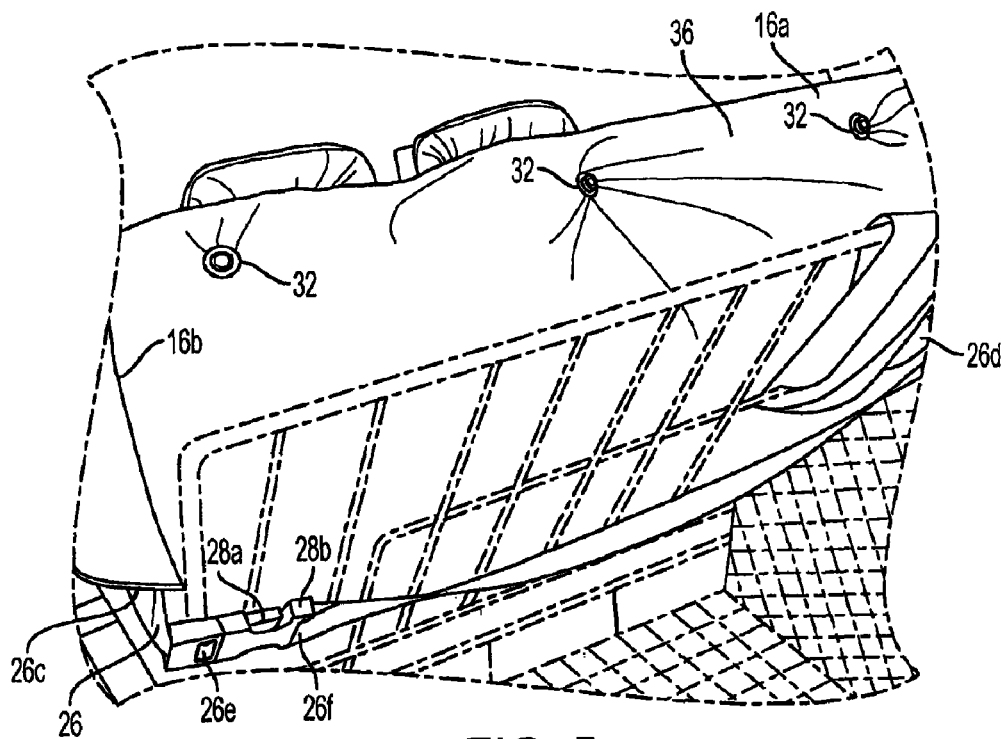

FIG. 5 illustrates a perspective view of the bottom surface of the back panel of the child seat liner shown in FIG. 1.

Figure 6:
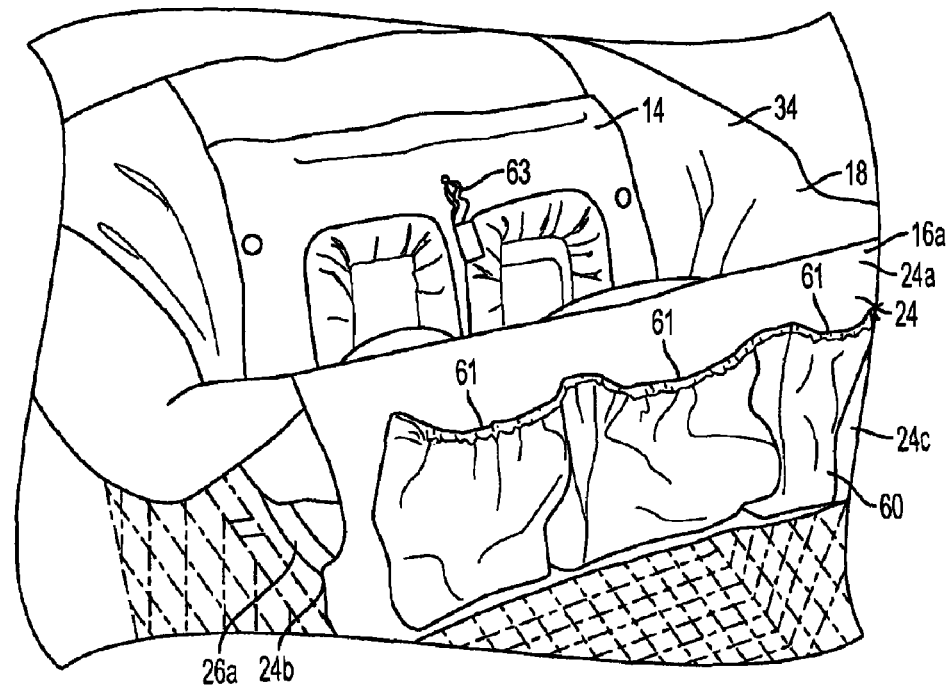

FIG. 6 illustrates an upper perspective view of the child seat liner shown in FIG. 1.

Figure 7:
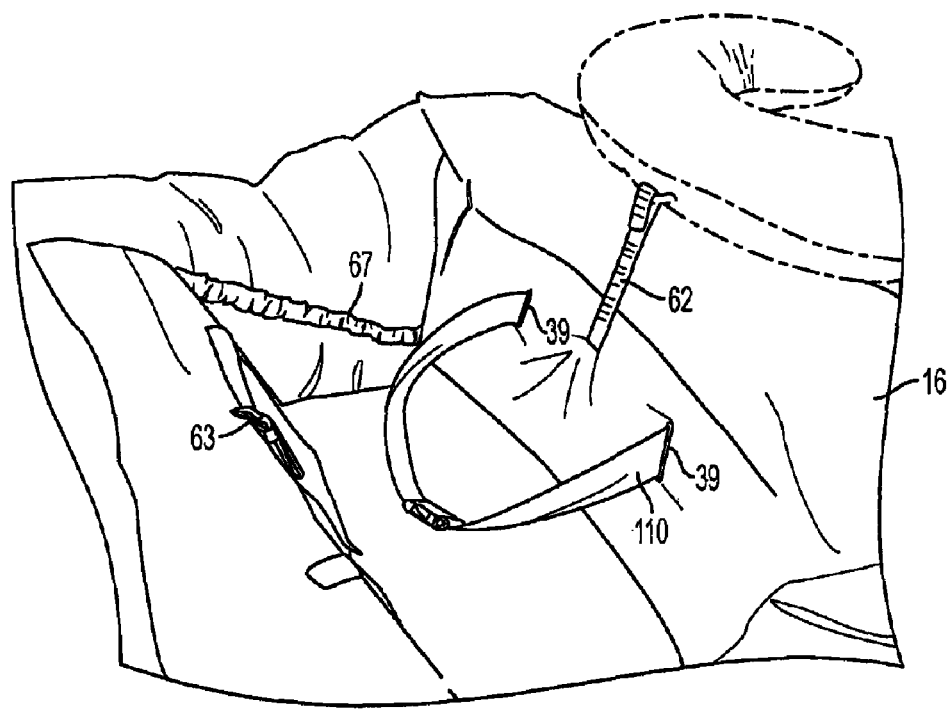

FIG. 7 illustrates an upper perspective view of the child seat liner shown in FIG. 1.

Figure 8:
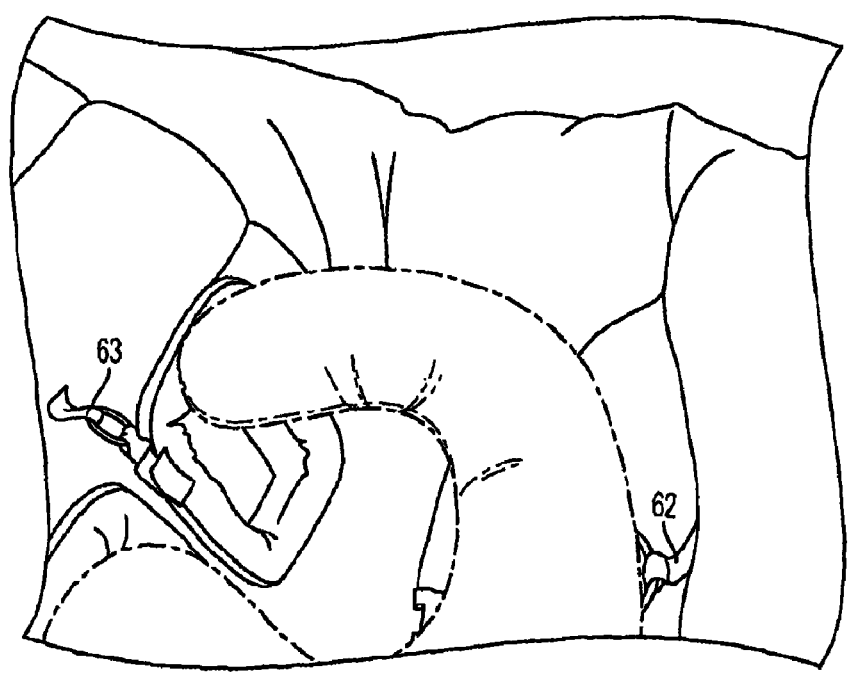

FIG. 8 illustrates an upper perspective view of the child seat liner shown in FIG. 1 in use with a support pillow according to one embodiment of the invention.

Figure 9:
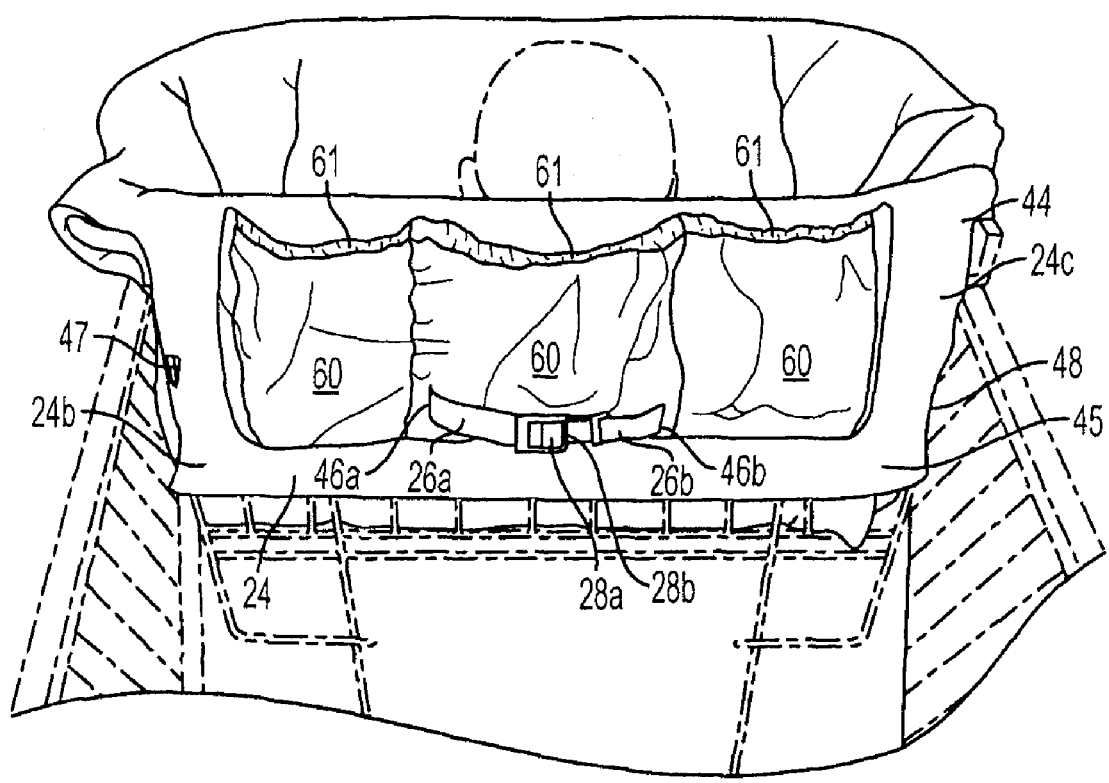

FIG. 9 illustrates an upper perspective view of the back flap of the child seat liner shown in FIG. 1.

Figure 10A:
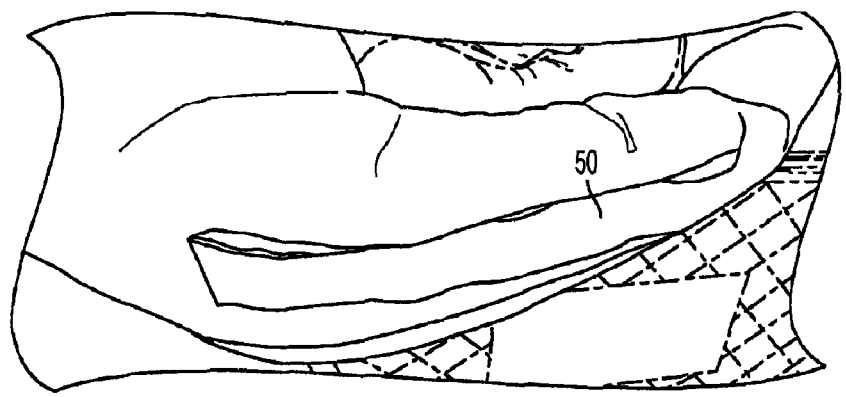

FIGS. 10A illustrates a side view of the child seat liner shown in FIG. 3 showing a slit pocket in a closed position according to one embodiment.

Figure 10B:
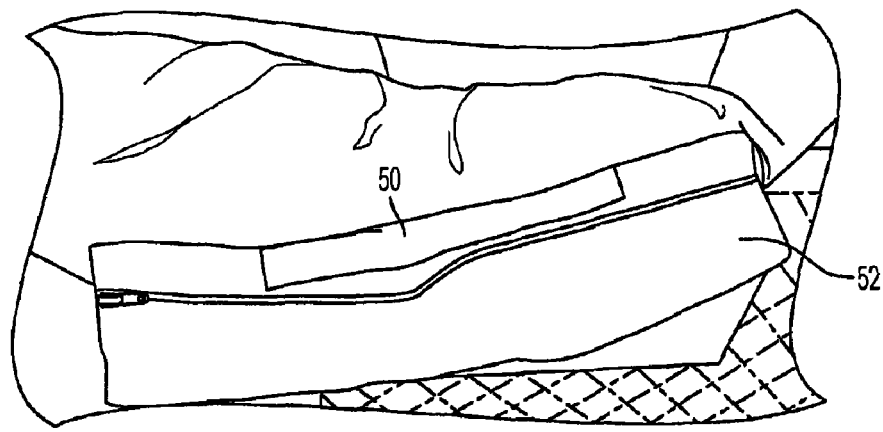
Figure 10C:
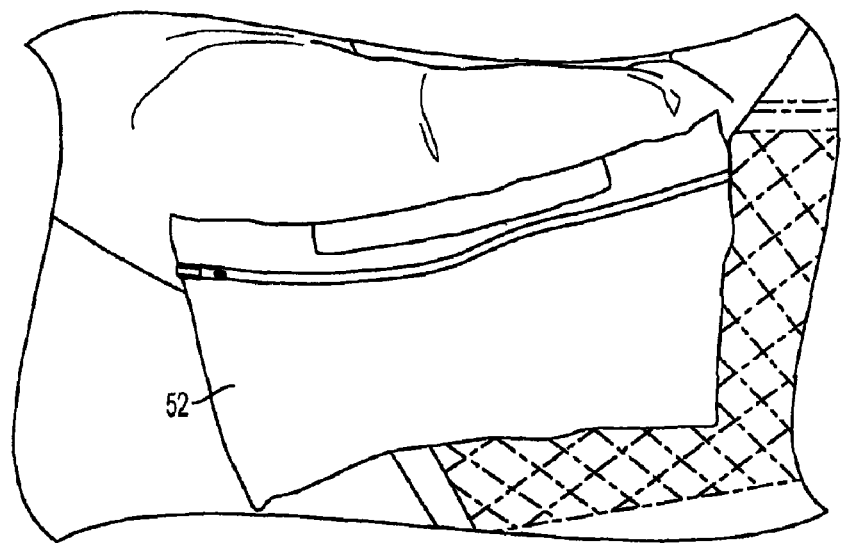

FIGS. 10B and 10C illustrate the side view of the child seat liner shown in FIG. 10A showing the slit pocket in an opened position with a zippered pocket pulled out of the slit pocket, according to one embodiment.

Figure 11:
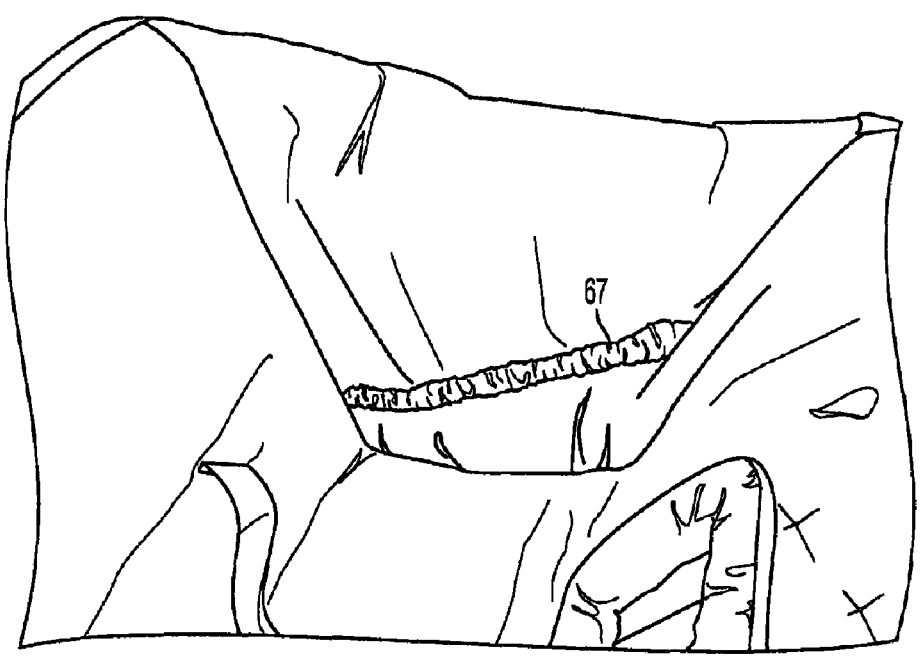

FIG. 11 illustrates an upper perspective view of a side portion of the child seat liner shown in FIG. 1.

DETAILED DESCRIPTION OF VARIOUS EMBODIMENTS OF THE INVENTION

Various embodiments of the invention are described more fully hereinafter with reference to the accompanying drawings, in which some, but not all embodiments of the invention are shown in the figures. These inventions may be embodied in many different forms and should not be construed as limited to the embodiments set forth herein. Rather, these embodiments are provided so that this disclosure will satisfy applicable legal requirements.

FIG. 1 illustrates a child seat liner 10 according to various embodiments. The child seat liner 10 includes a bottom portion 12, a front portion 14, a back panel 16, a first side portion 18, and a second side portion 20. The bottom portion 12 includes a front edge 12a, a back edge 12b, a first side edge 12c, and a second side edge 12d. The first side edge 12c and the second side edge 12d are intermediate the front side edge 12a and the back side edge 12b, and the first side edge 12c is opposite and spaced apart from the second side edge 12d. A lower perimeter 14a of the front portion 14 is disposed adjacent to the front edge 12a of the bottom portion 12, and a lower perimeter 18a of the first side portion 18, a lower perimeter 20a of the second side portion 20, and a lower perimeter 16a of the back panel 16 are disposed adjacent to the first side 12c, the second side 12d, and the back side 12b of the bottom portion 12, respectively.

In the embodiment shown in FIGS. 1 and 2, the front portion 14 includes an upper front portion 14b and a lower front portion 14c. The lower front portion 14c is integrally formed with the bottom portion 12 and defines two leg openings 22, and the upper front portion 14b is separately formed from the lower front portion 14c. In particular, a lower perimeter 14d of the upper front portion 14b is sewn to an upper perimeter 14e of the lower front portion 14c. The bottom portion 12 and the lower front portion 14c will hinge horizontally with respect to each other when the child seat liner 10 is placed into a shopping cart or other child seat.

In addition, the first side portion 18, the second side portion 20, and the back panel 16 are separately formed from each other and from the bottom portion 12 and the upper front portion 14b. In particular, a back edge 18b of the first side portion 18 is sewn to a first side edge 16b of the back panel 16, a back edge 20b of the second side portion 20 is sewn to a second side edge 16c of the back panel 16, and the back edge 12b of the bottom portion 12 is sewn to the lower perimeter 16a of the back panel 16. In addition, the lower perimeter 18a of the first side portion 18 is sewn to the first side edge 12c of the bottom portion 12, a first side edge 14f of the lower front portion 14c, and a first side edge 14g of the upper front portion 14b. Similarly, the lower perimeter 20a of the second side portion 20 is sewn to the second side edge 12d of the bottom portion 12, a second side edge 14h of the lower front portion 14c, and a second side edge 14i of the upper front portion 14b. The upper perimeter 14j of the upper front portion 14b and the upper perimeters 18c, 20c of the first side portion 18 and the second side portion 20, respectively, form one continuous edge 25.

As shown in FIG. 2, the upper front portion 14b and bottom portion 12 have a substantially rectangular shape, and the back panel 16 has a substantially trapezoidal shape. In addition, the side panels 18, 20 have a substantially rectangular shaped lower portion 18d, 20d, and an upper portion 18e, 20e of each side portion 18, 20, respectively, includes a substantially arcuate shaped side. However, in various alternative embodiments, the portions 12, 14, 16, 18, and 20 of the seat liner may have other shapes, such as, for example, substantially rectangular, substantially circular, or substantially triangular.

FIG. 3 illustrates the continuous edge 25 formed by the upper perimeters 14j, 18c, and 20c of the upper front portion 14b, the first side portion 18, and the second side portion 20, respectively. In this embodiment, one or more elastic bands 70a, 70b are incorporated (e.g., sewn) into a portion of the upper perimeters 18c, 20c of the first 18 and second side portions 20, respectively, of the continuous edge 25 adjacent each side edge 14g, 14i of the upper front portion 14b. The elastic bands 70a, 70b allow the continuous edge 25 to be stretched over and capture a front of the seat or a handle of a shopping cart. The elastic bands 70a, 70b cause at least a portion (e.g., corners adjacent the upper perimeter 14j of the upper front portion 14b) of the upper perimeters 18c, 20c of the side portions 18, 20, respectively, to gather (e.g., condenses their length) closer together such that when a force is applied to stretch the material, the elastic material allows the upper perimeters 18c, 20c to be stretched to their original size and shape. When the force is relaxed or released, the elastic material gathers the portions of the upper perimeters 18c, 20c to their smaller size.

In another embodiment (not shown), the elastic band may be incorporated into the upper perimeter 14j of the upper front portion 14b. In yet another embodiment, the elastic band may be incorporated into the upper perimeters 14j, 18c, and 20c of the upper front portion 14b, the first side portion 18, and the second side portion 20, respectively. Various alternative embodiments (not shown) may employ a stretchable cloth material to form the side portions 18, 20 and front portion 14 instead of or in addition to incorporating an elastic band. The stretchable cloth material can stretch in a horizontal and/or vertical direction and return to its original size.

The various portions 12, 14, 16, 18, and 20 of the child seat liner 10 may be formed from panels of material. For example, in various embodiments, as shown in FIGS. 5 and 6, the panels of material include an upper sheet of fabric, a lower sheet of fabric, and a layer of batting or padding between the upper sheet and the lower sheet. In the particular embodiment shown in FIG. 1, the bottom portion 12 and lower front portion 14c include additional tufting or bolstering to provide additional padding for the child seated in the child seat liner 10. The upper sheet of fabric defines a top surface 34 of the child seat liner 10, and the lower sheet defines a bottom surface 36 of the child seat liner 10. When disposed within a seat, the bottom surface 36 faces the seat, and the top surface 34 defines a space in which the child can be seated.

FIGS. 1 and 2 illustrate two leg openings 22 defined in the lower front portion 14c through which a child's legs may pass when seated on the bottom portion 12. The leg openings 22 include padded material 22a around the perimeter of the leg openings 22. In the particular embodiment shown in FIG. 1, the padded material 22a is sewn to the perimeter of the leg openings 22 and provides additional padding than would be provided by the panels of material used to form the lower front portion 14c. In addition, according to a particular embodiment, the leg openings 22 are sized to match the shape, size, and location of leg openings provided in a shopping cart seat. In an alternative embodiment (not shown), the padded material may be part of the panel used to form the lower front portion 14c, and a stitch may be run adjacent the perimeter of the leg openings 22 to form a padded area around the leg openings 22. In another alternative embodiment (not shown), the front portion 14c may include one opening through which both of a child's legs may pass.

In a further embodiment, as shown in FIGS. 2 and 6, the child seat liner 10 includes a back flap 24 that includes an upper perimeter 24a disposed adjacent to the upper perimeter 16d of the back panel 16. In one embodiment, the back flap 24 is separate from the back panel 16 and is sewn to the back panel 16 along the upper perimeters 24a, 16d of the back flap 24 and the back panel 16, respectively.

As shown in FIG. 9, the back flap 24 includes a first side perimeter 24b and a second side perimeter 24c, an inner surface 44, and an outer surface 45. The inner surface 44 is formed of an inner sheet of material, and the outer surface 45 is formed of an outer sheet of material. The inner sheet and the outer sheet are joined together (e.g., sewn, glued) substantially along the perimeter of the sheets to form the back flap 24 and to form a cavity between them. The outer surface 45 defines two openings 46a, 46b adjacent a medial portion of the back flap 24. In addition, a first side opening 47 is formed between the inner sheet and the outer sheet along the first side perimeter 24b, and a second side opening 48 is formed between the inner sheet and the outer sheet along the second side perimeter 24c. The openings 46a, 46b and the first 47 and second side openings 48 are in communication with the cavity. In addition, the first opening 46a and the second opening 46b may be grommets or button holes, for example.

The child seat liner 10 further includes an adjustable strap 26 as shown in FIGS. 5 and 9. The adjustable strap 26 includes a first portion 26a and a second portion 26b. A fixed end 26c of the first portion 26a is attached (e.g., sewn) adjacent the second side edge 16c of the back panel 16, and a fixed end 26d of the second portion 26b is attached adjacent the first side edge 16b of the back panel 16. Free ends 26e, 26f of each portion 26a, 26b include a fastener 28a, 28b, respectively, such as a buckle, slider, snaps, or hook and loop material, that can be mated together. The free end 26e of the first portion 26a is thread through the first side opening 47 of the back flap 24, and the second portion 26b is thread through the second side opening 48 of the back flap 24 such that a portion of each strap portion 26a, 26b extends through the cavity formed in the back flap 24. The free end 26e is further thread through first opening 46a, and the free end 26f is further thread through the second opening 46b such that the fasteners 28a, 28b are disposed outside of the cavity formed in the back flap 24 and are adjacent the outer surface 45.

To secure the child seat liner 10 to the seat, the back panel 16 and the back flap 24 are disposed on each side of the back of the seat such that the bottom surface 36 of the back panel 16 and the inner surface 44 of the back flap 24 face the back of the seat and each other. In addition, the fasteners 28a, 28b are mated together, and the strap 26 is tightened to further secure the back panel 16 and back flap 24 adjacent the back of the seat.

In the embodiment shown in FIG. 7, the back panel 16 may further define two openings 39 through which a safety belt 110 attached to the seat may be thread and secured around the child seated in the seat. The openings 39 may be grommets or button holes, for example. This arrangement allows the child to be secured adjacent the child seat liner 10 and the seat.

In another embodiment (not shown), a second strap may be provided with the seat liner 10. The second strap has two portions, and each portion has a fixed end and a free end. The fixed end of each portion is attached (e.g., sewn, glued) to the top surface 34 of the back panel 16, and the free ends of each portion include mating fasteners, such as those described above. The free ends of the portions of the second strap can be secured around the child seated in the seat liner 10 to retain the child in the seat liner 10.

In the embodiment shown in FIGS. 6 and 9, the back flap 24 includes one or more pockets 60 that each have a opening 61 adjacent the upper perimeter 24a of the back flap 24. In another embodiment (not shown), a cloth panel is attached to the back side of the back flap 24 along each side 24b, 24c of the back flap 24, and the cloth panel and the back flap 24 define a pocket having an opening adjacent the lower perimeter 24d of the back flap 24. The pocket slides over and receives the back of the seat to further secure the liner 10 to the seat.

Furthermore, according to various embodiments, the child seat liner 10 includes two sets of fasteners, such as snaps, buttons, or hook and loop material, that allow the liner 10 to be rolled up and secured for storage. In particular, as shown in FIGS. 2, 4, and 5, a first set of snap fasteners 30 is provided on the bottom surface 36 on the lower front portion 14c, and a second set of snap fasteners 32 is provided on the bottom surface 36 of the back panel 16. In the embodiment shown in FIGS. 4 and 5, the first set of fasteners 30 includes three snap fasteners that are spaced apart from each other along a horizontal axis that is substantially parallel to an axis extending through upper edges of the leg openings 22 and are disposed adjacent the upper edges of the leg openings 22. The second set of snap fasteners 32 includes three mating snap fasteners that are spaced apart from each other along a horizontal axis that is substantially parallel to an upper perimeter 16d of the back panel 16 and are disposed adjacent the upper perimeter 16d of the back panel 16. The smooth side of the snap fasteners of each set 30, 32 are disposed adjacent the top surface 34, and the coupling side of the snap fasteners 30, 32 are disposed adjacent the bottom surface 36. To roll up and store the child seat liner 10, a user folds the top surfaces 34 of the side portions 18, 20 toward the top surface 34 of the bottom portion 12, the outer surface 45 of the back flap 24 toward the top surface 34 of the back panel 16, and the top surface 34 of the upper front portion 14b toward the top surface 34 of the lower front portion 14c. The first set of snap fasteners 30 are then engaged with the second set of snap fasteners 32 to secure the seat liner 10 in a rolled up position. The user can utilize the portion 38 of the lower front portion 14c intermediate the two leg openings 22 as a handle for carrying the seat liner 10.

In various other embodiments, such as shown in FIG. 1, the child seat liner 10 further includes one or more fabric loops 40 spaced apart from each other and disposed horizontally along the lower front portion 14c adjacent the upper perimeter of the leg openings 22. The fabric loops 40 may be used to attach toy links, toys, or any other infant devices to the child seat liner 10. In addition, the child seat liner 10 may include one or more straps with a fastener on the end to attach a support pillow to the child seat liner. In the embodiment shown in FIGS. 7 and 8, the liner 10 includes first 62 and second fabric covered bungee straps 63 that each include hook and loop material on the ends thereof. The first strap 62 is disposed on the top surface 34 of the back panel 16, as shown in FIG. 7, and the second strap 63 is disposed on the top surface 34 of the front portion 14. In various embodiments, the ends of the bungee straps 62, 63 are stitched one or more times to the back panel 16 and the front portion 14, respectively, for a secure attachment. In a particular embodiment, the ends of the bungee straps 62, 63 are triple stitched.

In the embodiment shown in FIG. 10A-C, each of the first side portion 18 and the second side portion 20 define a slit pocket 50 in the top surface 34. The slit pocket 50 includes hook and loop fastener material on each side of the slit pocket 50 to keep the pocket concealed, such as shown in FIGS. 10A-10C. The slit pocket 50 is disposed adjacent the upper perimeters 18c, 20c of the lower portions 18d, 20d of the first and second side portions 18, 20, respectively, and is oriented substantially parallel to the upper perimeter 18c, 20c of the lower portion 18d, 20d of the side portions 18, 20, respectively. As shown in FIGS. 10B and 10C, a zippered pocket 52 is stored in each slit pocket 50 and is accessible when the slit pocket 50 is exposed. The zippered pocket 52 can be pulled out of the slit pocket 50 and allowed to hang alongside the upper perimeter 18c, 20c of the lower portions 18d, 20d of the side portion 18, 20, respectively. When the user does not want to use the zippered pocket 52, the user can folded up the pocket 52 and insert it back into the slit pocket 50. Placing the zippered pocket 52 on each of the side portions 18, 20 improves access to storage for the user and reduces the child's accessibility to the pockets 52. By adding a zipper or other closure devices to the pocket 52, the child is further prevented from accessing the contents within the pocket 52. Various alternative embodiments include other types of closures for the pockets 52, such as, for example, buttons, hooks, hook and loop material, or snap fasteners.

As shown in FIG. 11, fabric covered bungees 67 are sewn to the top surfaces 34 of each of the first side portion 18 and the second side portion 20. In particular, each bungee 67 includes two ends that are sewn to the side portions 18, 20, and the user can use the bungees 67 to hold various items within the child seat, such as, for example, bottles or other baby devices. In various embodiments, the ends are stitched one or more times to the side portions for a secure attachment.

In various alternative embodiments, the various portions 12, 14, 16, 18, and 20 may be integrally formed, in part or in whole. For example, in one alternative embodiment (not shown), the front portion 14, the first side portion 18, the second side portion 20, and the bottom portion 12 are integrally formed as one panel and the back panel 16 is separately formed and sewn to the side portions 18, 20 and the bottom portion 20. In yet another alternative embodiment (not shown), the lower front portion 14c may be separately formed from the bottom portion 20, and the lower perimeter of the lower front portion 14c may be sewn to the front edge of the bottom portion 12.

In another alternative embodiment (not shown), the non-engaging ends of the adjustable strap portions 26a, 26b are attached to the lower perimeter 16a of the back panel 16.

To use the seat liner 10 with a shopping cart seat, according to one embodiment, the seat liner 10 is unrolled from a closed position to an open position. The seat liner 10 is then placed in the shopping cart seat such that the lower sheet of fabric 36 of the bottom portion 12 faces the surface of the seat and the leg openings 22 align with the leg openings on the seat. The upper perimeter 14j of the upper front portion 14b is stretched over the handle bar of the shopping cart seat, and the back of the shopping car seat is received in the pocket defined between the back panel 16 and the back flap 24. The strap 110 provided in the seat can be thread through the openings 39 in the back panel 16 and secured around the child seated therein. In addition, the adjustable strap 26 provided with the seat liner 10 can be tightened to secure the back panel 16 and back flap 24 against the back of the shopping cart seat.

To remove the seat liner 10 from the shopping cart seat, the upper perimeter 14j of the upper front portion 14b is stretched and pulled away from the handle of the shopping cart, the adjustable strap 26 is loosened and/or disengaged to allow the back flap 24 and back panel 16 to be removed from the back of the shopping cart seat, and the strap from the shopping cart seat is disengaged and pulled out of the openings 46a, 46b.

The invention claimed is:
1. A child seat liner comprising:
   a bottom portion having a front side, a back side opposite said front side, a first side, and a second side opposite said first side, wherein said back side is disposed intermediate said first side and said second side;
   a front portion disposed adjacent said front side of said bottom portion, said front portion defining two leg openings through which a child's legs may pass when seated on the bottom portion;
   a first side portion disposed adjacent said first side of said bottom portion;
   a second side portion disposed adjacent said second side of said bottom portion;
   a back panel disposed adjacent said back side of said bottom portion along a lower perimeter of said back panel;
   a back flap, said back flap comprising an upper perimeter disposed adjacent an upper perimeter of said back panel; and
   an adjustable strap, said adjustable strap comprising a first portion and a second portion, each of said first portion and said second portion comprising a fixed end and a free end, said fixed end of said first portion being disposed adjacent said back panel and said fixed end of said second portion being disposed adjacent said back panel,
   wherein said back flap comprises a first side perimeter and a second side perimeter, said first side perimeter defines a first side opening through which said free end of said first portion is threadable, and said second side perimeter defines a second side opening through which said free end of said second portion is threadable,
   said back flap further defining a first opening and a second opening on an outer surface of said back flap, said free end of said first portion being threadable through said first opening and said free end of said second portion being threadable through said second opening such that fasteners attached to said free ends of said first portion and said second portion are engagable adjacent said outer surface of said back flap.

2. The child seat liner of claim 1,
   wherein said leg openings comprise a padded material around a perimeter thereof, said padded material being more padded than a portion of said front portion adjoining said leg openings.

3. The child seat liner of claim 1 wherein said adjustable strap is a first adjustable strap and said back panel defines two openings through which a second adjustable strap may pass.

4. The child seat liner of claim 1,
   wherein upper perimeters of said front portion and said first and second side portions form a continuous upper edge, a portion of said continuous upper edge being stretchable.

5. The child seat liner of claim 4 wherein each of said side portions comprises a corner portion disposed adjacent said front portion, and each of said corner portions comprise at least one elastic band integrated within each of said corner portions along said continuous edge.

6. The child seat liner of claim 5 wherein each of said corner portions and said front portion comprise at least one elastic band integrated within said corner portions and said front portion along said continuous edge.

7. The child seat liner of claim 4 wherein said front portion comprises at least one elastic band integrated within said front portion along said continuous edge.

8. The child seat liner of claim 4 wherein at least a portion of said front portion and said side portions adjacent said front portion are formed of a stretchable material.

9. The child seat liner of claim 4, wherein said stretchable portion of said continuous upper edge is a first portion and a second portion of said continuous upper edge is not stretchable.

10. A child seat liner comprising:
a bottom portion having a front side, a back side opposite said front side, a first side, and a second side opposite said first side, wherein said back side is disposed intermediate said first side and said second side;
a front portion disposed adjacent said front side of said bottom portion, said front portion defining two leg openings through which a child's legs may pass when seated on the bottom portion;
a first side portion disposed adjacent said first side of said bottom portion;
a second side portion disposed adjacent said second side of said bottom portion; and
a back panel disposed adjacent said back side of said bottom portion,
wherein:
each of said bottom portion, said front portion, said first and second side portions, and said back panel comprise a top surface and a bottom surface, said child seat liner being disposable in a seat such that said bottom surfaces face the seat,
said bottom surface of said front portion comprises at least one set of fasteners disposed adjacent said leg openings and said bottom surface of said back panel comprises at least one mating set of fasteners disposed adjacent an upper perimeter of said back panel,
said top surfaces of said side portions, said back panel and said front portion are foldable toward said top surface of said bottom portion such that said at least set of fasteners on said front portion is engagable with said at least one set of mating fastener on said back panel for securing said child seat liner in a rolled-up position.

11. The child seat liner of claim 10 wherein said first set of fasteners comprises one or more snap fasteners and said second set of fasteners comprises one or more mating snap fasteners.

12. The child seat liner of claim 10, wherein said leg openings comprise a padded material around a perimeter thereof, said padded material being more padded than a portion of said front portion adjoining said leg openings.

13. The child seat liner of claim 10, wherein an upper perimeter of said front portion and said first and second side portions form a continuous upper edge, a portion of said continuous upper edge being stretchable.

14. The child seat liner of claim 13 wherein each of said side portions comprises a corner portion disposed adjacent said front portion, and each of said corner portions comprise at least one elastic band integrated within each of said corner portions along said continuous edge.

15. The child seat liner of claim 14 wherein each of said corner portions and said front portion comprise at least one elastic band integrated within said corner portions and said front portion along said continuous edge.

16. The child seat liner of claim 13 wherein said front portion comprises at least one elastic band integrated within said front portion along said continuous edge.

17. The child seat liner of claim 13 wherein at least a portion of said front portion and said side portions adjacent said front portion are formed of a stretchable material.

18. The child seat liner of claim 13, wherein said stretchable portion of said continuous upper edge is a first portion and a second portion of said continuous upper edge is not stretchable.

* * * * *